(12) United States Patent
Seungpyo et al.

(10) Patent No.: US 7,691,017 B2
(45) Date of Patent: Apr. 6, 2010

(54) HYDRAULIC TENSIONER

(75) Inventors: Shin Seungpyo, Kyunggi-do (KR); Simon Barrette, Nabari (JP)

(73) Assignee: BorgWarner Morse TEC Japan K.K., Nabari (JP)

( * ) Notice: Subject to any disclaimer, the term of this patent is extended or adjusted under 35 U.S.C. 154(b) by 1419 days.

(21) Appl. No.: 11/084,393

(22) Filed: Mar. 18, 2005

(65) Prior Publication Data
US 2005/0239589 A1 Oct. 27, 2005

Related U.S. Application Data

(63) Continuation-in-part of application No. 10/922,207, filed on Aug. 19, 2004, now abandoned.

(30) Foreign Application Priority Data
Apr. 23, 2004 (JP) .............................. 2004-128026

(51) Int. Cl.
*B67D 5/22* (2006.01)
*F16H 7/22* (2006.01)

(52) U.S. Cl. .................. 474/109; 474/110; 474/111; 474/140; 267/179; 267/180; 267/166; 267/167; 267/155

(58) Field of Classification Search ......... 474/109–111, 474/140; 267/179–180, 166–167, 155
See application file for complete search history.

(56) References Cited

U.S. PATENT DOCUMENTS

| 4,735,403 A | 4/1988 | Matsumoto et al. |
| 5,304,099 A * | 4/1994 | Deppe et al. ................ 474/110 |
| 5,346,436 A | 9/1994 | Hunter et al. ............... 474/110 |
| 5,911,641 A | 6/1999 | Sheren et al. |
| 6,634,973 B1 | 10/2003 | Simpson et al. |

(Continued)

FOREIGN PATENT DOCUMENTS

DE 4431161 9/1994

(Continued)

OTHER PUBLICATIONS

Mathworld, "Cassini Ovals", mathworld.wolfram.com.., 3 pages.

*Primary Examiner*—Bradley T King
*Assistant Examiner*—Mahbubur Rashid
(74) *Attorney, Agent, or Firm*—Brown & Michaels, PC

(57) ABSTRACT

A hydraulic tensioner comprising a piston slidably inserted in a piston bore of a housing having rack teeth on an outer circumference thereof, a piston spring biasing the piston in a protruding direction, a pawl member having teeth engageable with the rack teeth of the piston to permit protruding movement of the piston but to block reverse movement of the piston provided in a pawl hole of the housing, and a pawl spring in a pawl spring hole of a generally elliptical cross-section that biases the pawl member in an engaging direction of the teeth of the pawl member with the rack teeth of the piston. A long axis of the generally elliptical cross-sectional shape of the pawl spring is oriented toward an axial direction of the piston. Wire portions of the pawl spring substantially follow the long axis that contacts an upper surface of the pawl member.

4 Claims, 10 Drawing Sheets

U.S. PATENT DOCUMENTS

| | | |
|---|---|---|
| 6,852,049 B2 | 2/2005 | Markley et al. |
| 6,878,082 B2 | 4/2005 | Seungpyo |
| 2004/0067805 A1 * | 4/2004 | Hellmich et al. ............ 474/101 |
| 2004/0204272 A1 * | 10/2004 | Seungpyo et al. ........... 474/109 |

FOREIGN PATENT DOCUMENTS

| | | |
|---|---|---|
| EP | 0657662 | 6/1995 |
| GB | 2181210 | 4/1987 |
| JP | 06-94089 | 4/1994 |
| JP | 7158703 | 6/1995 |
| JP | 08-4835 | 1/1996 |
| JP | 2000136780 | 5/2000 |
| JP | 2001029780 | 2/2001 |

* cited by examiner

HYDRAULIC TENSIONER

REFERENCE TO RELATED APPLICATIONS

This is a continuation-in-part of copending application Ser. No. 10/922,207, filed Aug. 19, 2004, entitled "HYDRAULIC TENSIONER", which claimed an invention which was disclosed in Japanese Application No. 2003-311278, filed Sep. 3, 2003, entitled "Hydraulic Tensioner." The application also claims priority from Japanese Application No. 2004-128026, filed Apr. 23, 2004, entitled "Hydraulic Tensioner." The aforementioned applications are hereby incorporated herein by reference.

BACKGROUND OF THE INVENTION

1. Field of the Invention

The present invention relates to a hydraulic tensioner for imparting appropriate tension to a chain, belt or the like, and more particularly, to a hydraulic tensioner having a ratchet mechanism to prevent retraction of a piston at the time of decreased hydraulic pressure.

2. Description of Related Art

A hydraulic tensioner generally includes a housing, a piston that is biased in a protruding direction by a spring and fitted slidably into a piston hole formed in the housing, and a fluid chamber defined by the piston and the piston hole of the housing. During operation, the combined efforts of the spring load and the hydraulic pressure in the chamber balances the external force from a chain or belt imparted on the distal end of the piston.

When external force is applied from a chain to the distal end of a piston during inadequate hydraulic pressure in the chamber, such as at the time of engine start, the piston is easily forced to retract into the housing, thereby causing noise or oscillation.

In order to prevent such retraction of the piston, various kinds of hydraulic tensioners with ratchet mechanisms have been proposed, such as shown in Japanese patent application laid-open publication No. 7-158703.

The hydraulic tensioner of Japanese patent application laid-open publication No. 7-158703 includes a rack received in a longitudinal hole disposed parallel to the piston hole and engaged with a shoulder portion of the piston via a flange, a ratchet received in a lateral hole communicating with the longitudinal hole and engaged with the rack, and a spring biasing the ratchet in an engaging direction with the ratchet.

When the piston protrudes, the rack moves along with the piston via the flange in a protruding direction. When the piston retracts due to the external force of the distal end of the piston of the chain, only the piston retracts and as the distal end of the piston moves to the position of the distal end of the rack, the rearward movement of the piston is halted by the engagement of the ratchet with the rack. Additionally, in this case, a stepped portion of the distal end of the piston relative to the distal end of the flange provides backlash for the tensioner.

Another example of a hydraulic tensioner with a pawl ratchet mechanism is U.S. Pat. No. 5,304,099. The ratchet mechanism includes a rack teeth portion that is formed on a sleeve disposed around the piston, a pawl housed in a pawl hole extending perpendicular to a piston bore with a distal end portion engageable with the rack teeth portion of the sleeve, and a pawl coil spring that biases the pawl in an engaging direction with the rack teeth portion.

When the piston moves in a protruding direction along the sleeve, the distal end portion of the pawl engages the rack teeth portion of the sleeve, and the piston is allowed to move in the protruding direction in such a way that the rack teeth portion of the sleeve travels over the distal end portion of the pawl. When the piston moves in a retracting direction along the sleeve, the piston is prevented from moving in the retracting direction by maintaining the engagement of the rack teeth portion of the sleeve with the distal end portion of the pawl.

The prior art tensioners require a rack separate from the piston, thereby making the structure of the tensioners complicated.

The present invention addresses such problems and its object is to provide a hydraulic tensioner with a backlash mechanism that can simplify the structure of the tensioner. Another object of the present invention is to provide a hydraulic tensioner with a backlash mechanism that can apply stable spring force to the pawl member.

SUMMARY OF THE INVENTION

A hydraulic tensioner according to the present invention includes a housing having an axially extending piston hole or bore formed therein, and a piston axially slidable in the piston hole that forms a fluid chamber with the piston hole and is formed with rack teeth on at least a portion of an outer circumference of the piston. A piston spring in the piston hole biases the piston in a protruding direction. A pawl member in the housing has a teeth portion engageable with the rack teeth of the piston, so as to permit the movement of the piston in a protruding direction but to prevent its movement in a retracting direction. A pawl hole formed in the housing receives the pawl member with a clearance relative to a front and rear end surface of the pawl member. A pawl coil spring that is provided in a pawl spring hole formed in the housing and connected to the pawl hole, biases the pawl member in an engaging direction of the teeth portion of the pawl member with the rack teeth.

According to the present invention, since the rack teeth are formed on the outer circumference of the piston, there is no need to provide a rack separate from the piston, thereby making the structure simple. Moreover, in this case, since the pawl member has a teeth portion engageable with the rack teeth of the piston disposed with a longitudinal clearance formed relative to the pawl hole, the clearance functions to provide backlash to the tensioner. Thereby, a hydraulic tensioner with a backlash mechanism is achieved with a simple structure.

In one embodiment, the pawl coil spring is coiled in a generally elliptical tubular shape to follow the contour of the inner surface of the pawl spring hole and the long axis or the major axis of the generally elliptical cross-sectional shape of the pawl coil spring is oriented toward the axial direction of the piston. Also, a wire portion of the pawl coil spring substantially following the long axis contacts an upper surface of the pawl member.

When the pawl member moves along with the piston during operation, the wire portion of the pawl coil spring substantially following the long axis contacts the upper surface of the pawl member constantly. Thereby, during transfer of the pawl member, contact area of the pawl coil spring with the upper surface of the pawl member can be made nearly constant and thus, compressive force of the pawl coil spring against the pawl member can be made nearly constant. As a result, during operation, constantly stable compressive force is applied to the pawl member.

In another embodiment, the generally elliptical cross-sectional shape of the pawl coil spring is formed of a pair of linear portions following the long axis and disposed opposite each other and a pair of semi-circular portions disposed at opposite ends of the linear portions. The linear portions contact the upper surface of the pawl member.

During transfer of the pawl member, the contact area of the pawl coil spring with the upper surface of the pawl member can be made constant and thus, compressive force of the pawl coil spring against the pawl member can be made constant. As a result, during operation, a constant, more stable compressive force is applied to the pawl member.

In one embodiment, the pawl coil spring has a true elliptical cross-sectional shape.

In another embodiment, a cover on the housing is provided to cover an opening portion of the pawl spring hole to prevent the falling off of the pawl coil spring out of the housing.

In an alternative embodiment, a hydraulic tensioner includes a housing having an axially extending piston hole or bore formed therein, a piston axially slidable in the piston hole that forms a fluid chamber with the piston hole and is formed with rack teeth on at least a portion of an outer circumference of the piston. A piston spring in the piston hole the biases the piston in a protruding direction. A pawl member in the housing has a teeth portion engageable with the rack teeth of the piston, so as to permit the movement of the piston in a protruding direction but to prevent its movement in a retracting direction. A pawl hole formed laterally and upwardly in the housing to receive the pawl member with a clearance relative to a front and rear end surface of the pawl member. A pawl spring receiving portion provided at an upper portion of the housing to penetrate the pawl hole, and a pawl coil spring that is substantially elliptically cylindrically shape and received in the pawl spring receiving portion to bias the upper surface of the pawl against the piston, such that the teeth portion of the pawl engage the rack teeth portion of the piston and the major axis of an elliptical sectional shape is aligned with the axial direction of the piston. A cover with a supporting portion is detachably provided on the housing to cover the pawl spring receiving portion and to support the pawl coil spring laterally.

In one embodiment of the alternative tensioner, the pawl coil spring is coiled in a generally elliptical tubular shape to follow the contour of the inner surface of the pawl spring hole and the long axis of the generally elliptical cross-sectional shape of the pawl coil spring is oriented toward the axial direction of the piston. Also, a wire portion of the pawl coil spring substantially following the long axis contacts an upper surface of the pawl member.

During movement of the pawl, the contact area of the pawl coil spring relative to the upper surface of the pawl is made substantially constant. As a result, the compressive load of the pawl coil spring onto the pawl is made constant, achieving a stable spring force to the pawl.

Since the cover for the pawl coil spring receiving portion has a supporting portion to laterally support the pawl coil spring, the elliptical pawl coil spring is stably supported. In this embodiment, the cover is provided discretely from the housing, thereby forming a cover that easily conforms to the outline of the pawl coil spring. As a result, manufacturing costs are reduced.

In another embodiment of the alternative tensioner, the generally elliptical cross-sectional shape of the pawl coil spring is formed of a pair of linear portions following the long or major axis and disposed opposite each other and a pair of semi-circular portions disposed at opposite ends of the linear portions. The linear portions contact the upper surface of the pawl member. The contact area of the pawl coil spring on the upper surface of the pawl is substantially constant, thereby making the compressive force of the pawl coil spring against the pawl substantially constant. As a result, during operation of the tensioner a stable spring force is imparted to the pawl.

In one embodiment, the pawl coil spring is a true elliptical shape.

In another embodiment, the cover has a pair of shoulder portion that flange out from the lower ends of the supporting portion to cover the upper surface of the pawl.

The inequality $h_b < C < h_d$ is satisfied in the alternative tensioner, where C is a clearance between the inner surface of the shoulder portion and the upper surface of the pawl. The distance between the distal end surface of the teeth portion of the pawl and the distal end surface of the rack teeth of the piston is $h_b$. The distance between the distal end surface of the teeth portion and the outer circumferential surface of the piston is $h_d$.

Since $h_b < C$, the rack teeth portion of the piston travels over the teeth portion of the pawl without interference from the upper surface of the pawl with the inner wall surface of the shoulder portion of the cover when the rack teeth portion of the piston rides onto the teeth portion of the pawl to lift up the pawl during protruding movement of the piston during operation, allowing smooth travel of the piston in a protruding direction. Furthermore, since $C < h_d$, the outer circumferential surface of the piston without a rack teeth portion cannot be transferred to the position of the teeth portion of the pawl, preventing an unexpected disengagement of the rack teeth of the piston with the teeth portion of the pawl.

According to the present invention, since the rack teeth are formed on the outer circumference of the piston, there is no need to provide a rack discretely from the piston, thereby making the structure simple. Moreover, in this case, since the pawl member has a teeth portion engageable with the rack teeth of the piston disposed with a longitudinal clearance formed relative to the pawl hole, the clearance functions to provide backlash to the tensioner. Thereby, a hydraulic tensioner with a backlash mechanism is achieved with a simple structure.

DETAILED DESCRIPTION OF THE INVENTION

Figure 1:
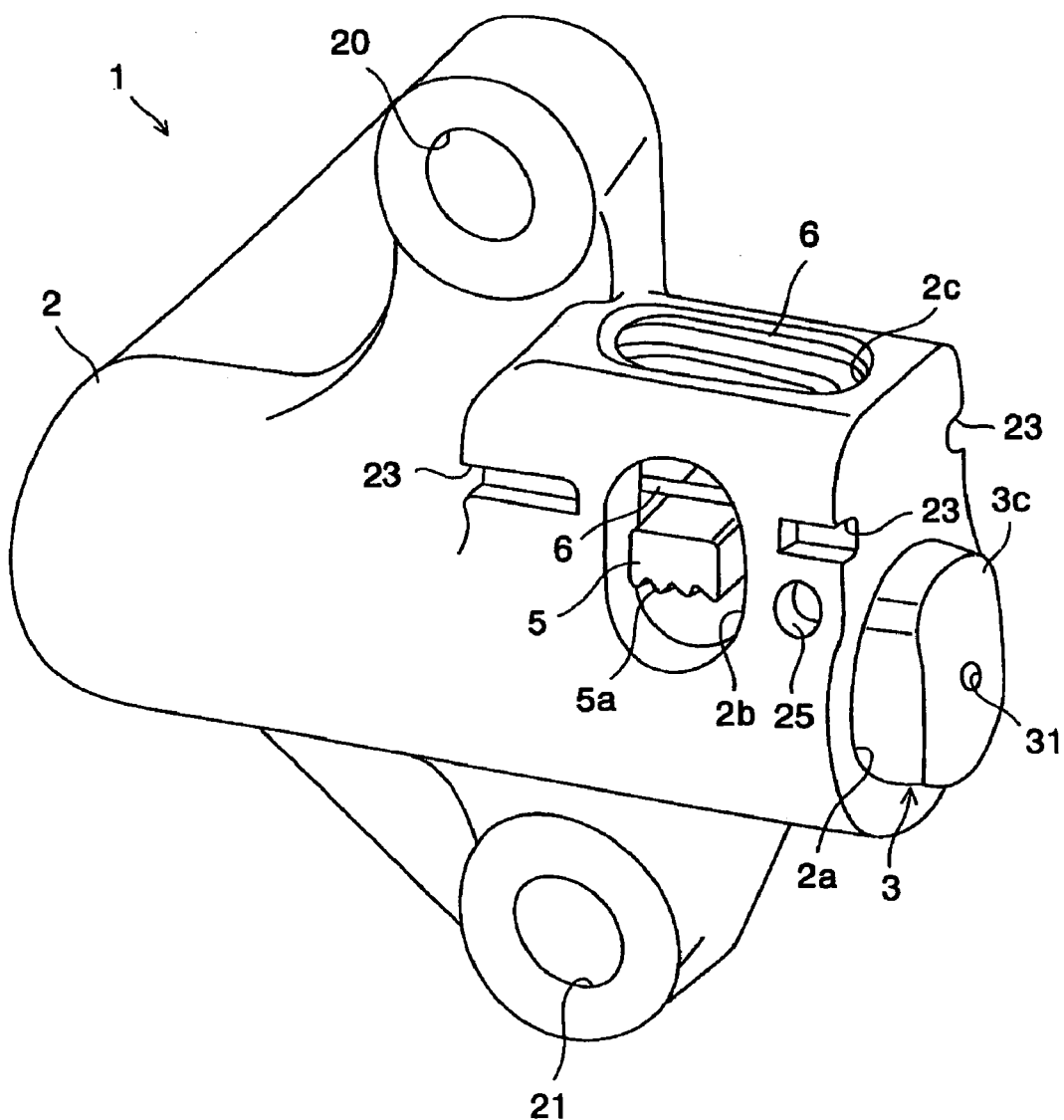
FIG. 1 is a perspective view of a hydraulic tensioner without a cover according to an embodiment of the present invention.
Figure 2:
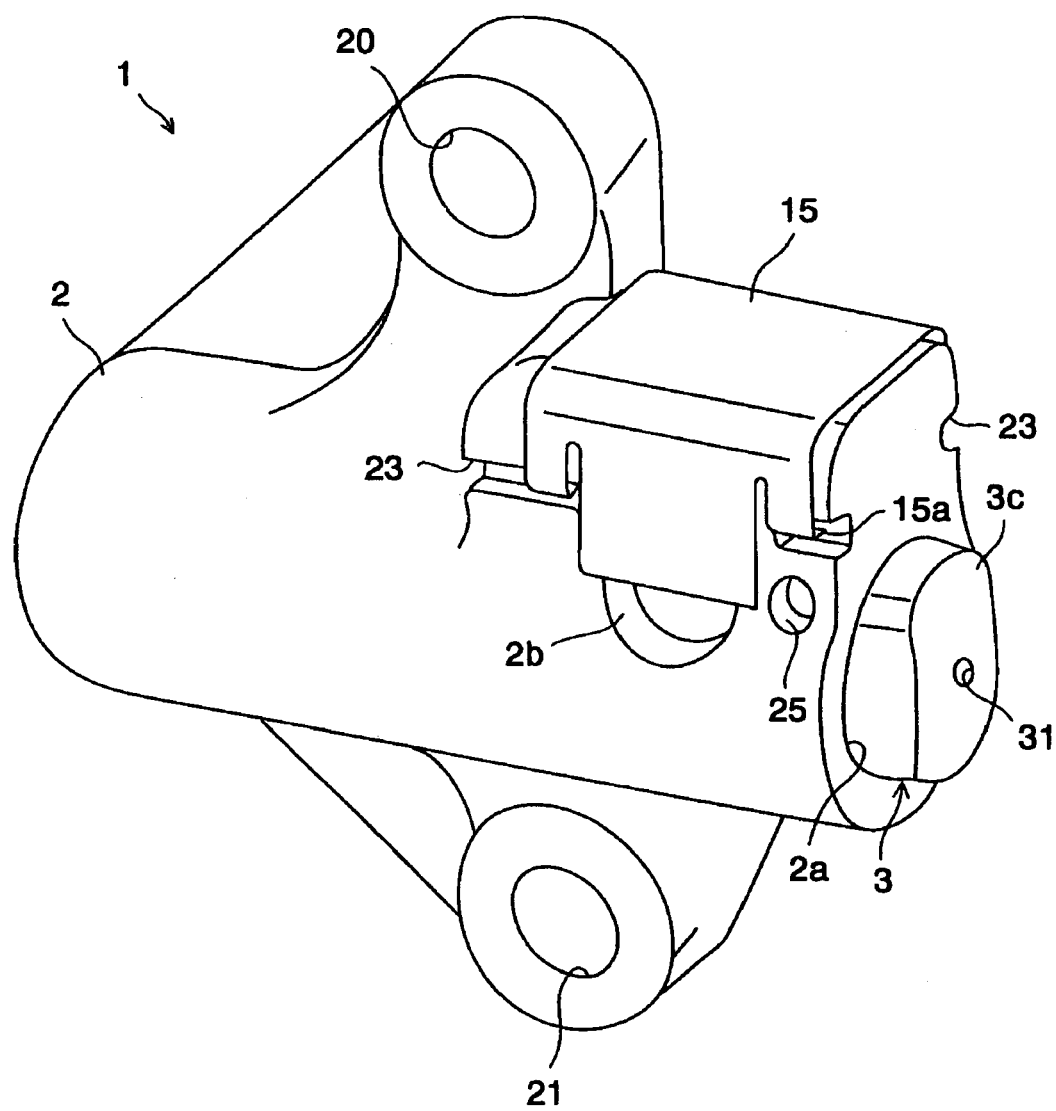
FIG. 2 is a perspective view of a hydraulic tensioner with a cover attached according to an embodiment of the present invention.
Figure 3:
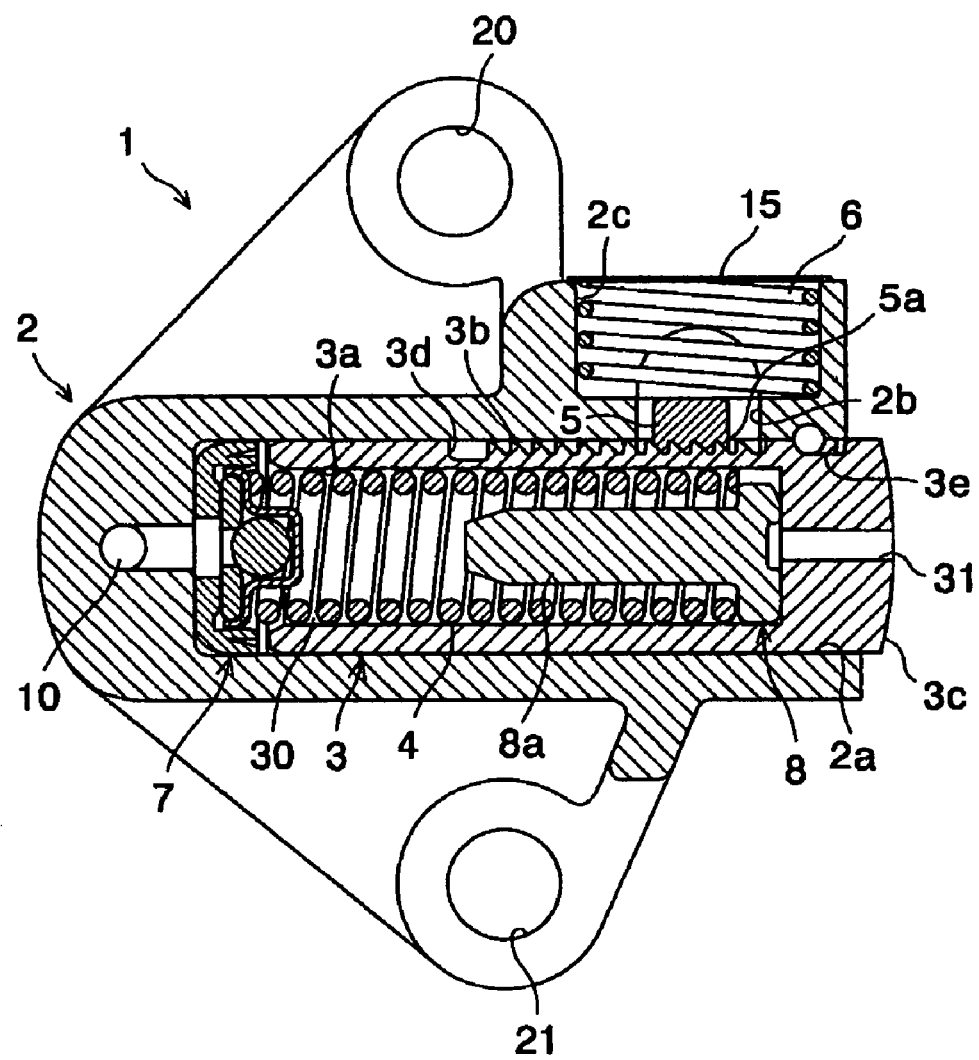
FIG. 3 is a longitudinal sectional view of a hydraulic tensioner of FIG. 2.

As shown in FIGS. 1-3, a hydraulic tensioner 1 includes a housing 2 with an axially extending piston bore 2a, one end of which opens outside, a hollow piston 3 fitted axially slidable in the bore 2a, and a piston spring 4 provided in the bore 2a and biasing the hollow piston 3 in a protruding direction from the bore 2a.

The housing 2 has attachment holes 20, 21 for inserting bolts (not shown) to fit the tensioner 1 onto the engine. Inside the housing 2, a fluid chamber 30 is defined by an inner space 3a formed in the piston 3 and an inside wall surface of the bore 2a. On the bottom of the housing 2, an inlet passage 10 is formed to introduce engine oil from an outside source of pressurized fluid (not shown) to the fluid chamber 30.

A check valve 7 is provided at a bottom portion of the bore 2a in the housing 2 to permit flow of fluid into the chamber 30 from the inlet passage 10 but to block fluid flow in a reverse direction. Here, a ball-type check valve is used, but any other suitable structure may be employed to form a check valve.

A vent disk 8 is provided on the top side of the inner space 3a of the piston 3 to discharge air trapped in the fluid chamber 30 to the outside of the tensioner and to control leakage of the fluid from the fluid chamber 30. The vent disk 8 has a spiral groove (not shown) on the side surface thereof and a shaft portion 8a. The top portion of the piston 3 has an axially extending through hole 31. Air in the fluid chamber 30 along with the fluid containing the air is discharged to the outside the tensioner from the spiral groove of the vent disk 8 through the hole 31. The piston spring 4 is provided around the shaft portion 8a of the vent disk 8 and an end of the piston spring 4 biases the vent disk 8 toward the top portion of the piston 3.

Rack teeth 3b are formed on a portion of an outer circumference of the piston 3. A pawl hole 2b opens into the piston bore 2a and is formed in the housing 2. A pawl member 5 is disposed in the pawl hole 2b. The pawl member 5 has a teeth portion 5a formed on the bottom surface thereof. The teeth portion 5a are engageable with the rack teeth 3b of the piston 3 so as to permit the movement of the piston 3 in a protruding direction and to restrain the rearward movement. An axial clearance is formed between the pawl hole 2b and the front and rear surface of the pawl member 5 (see FIG. 3). The pawl member 5 can be axially translatable in the pawl hole 2b by the length of such a clearance.

In the housing 2, a pawl spring hole 2c is formed that opens upwardly in communication with the pawl hole 2b. The pawl spring hole 2c is formed in a generally elliptical cross-sectional shape. In the pawl spring hole 2c, a pawl coil spring 6 is provided in a compressive state to bias the pawl member 5 so that the teeth portion 5a of the pawl member 5 can engage with the rack teeth 3b of the piston 3. The pawl coil spring 6 is coiled in a generally elliptical shape to follow the inner circumference of the pawl spring hole 2c.

Figure 4:
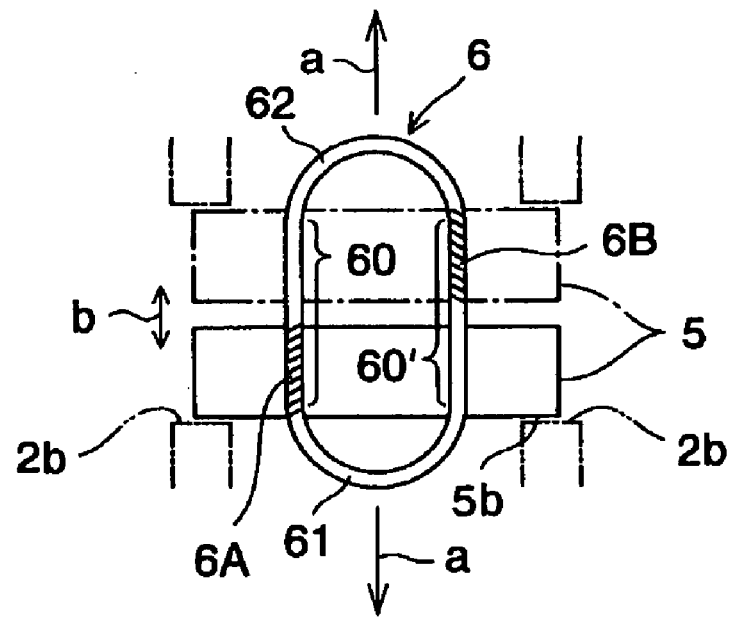
FIG. 4 is a top plan view illustrating a positional relationship between the elliptically coiled pawl coil spring and the pawl member according to the hydraulic tensioner of the present invention.

As shown in FIG. 4, the vertical direction a of the long axis of the generally elliptical cross-sectional shape of the pawl coil spring 6 coincides with an axial direction of the piston 3. Wire portions 60, 60' disposed at the lower end of the pawl coil spring 6 extend linearly and opposite each other and are substantially parallel to the direction of the long axis contact the upper surface of the pawl member 5. At opposite ends of the wire portions 60, 60', semi-circular portions 61, 62 are formed, respectively.

The pawl coil spring 6 has a cross-sectional shape formed of a pair of linear portions and semi-circular portions, which is of the shape described mathematically as a "Cassini ellipse". However, it will be understood by one skilled in the art that the spring of the present invention may also have a conventional elliptical cross-sectional shape, in which the linear portions are slightly curved. For the purposes of this invention it will be understood that when the term "elliptical" or "generally elliptical" is used, what is meant is either a Cassini ellipse or a conventional ellipse or similar figures.

Also, at an opening portion of the pawl spring hole 2c of the housing 2, a cover 15 is provided to cover the opening portion (see FIG. 2). The cover 15 prevents the pawl coil spring 6 from falling out of the pawl spring hole 2c. The cover 15 is formed by bending a metal sheet in a U-shape. The cover 15 also has a plurality of bent portions 15a at lower ends thereof, which are adapted to engage a plurality of concavities 23 formed on the housing 2 for attachment of the cover 15 to the housing 2.

In the vicinity of the opening portion of the piston hole 2a of the housing 2, a laterally extending through hole 25 is formed, as shown in FIGS. 1 and 2. On the top portion of the piston 3, a laterally extending groove 3e is formed, as shown in FIG. 3. The through hole 25 and engagement groove 3e are provided to maintain the piston 2 in a retracted state at the time of shipment of the tensioner. The piston 2 is maintained in a retracted state by inserting a retaining pin (not shown) into the through hole 25 and the engagement groove 3e when they are aligned with each other.

At the back of the rearmost tooth of the rack teeth 3b of the piston 3, a stop groove 3d is formed. The stop groove 3d is provided to prevent further protrusion of the piston 3 by the engagement with the teeth portion 5a of the pawl member 5.

When the chain slacks or the tension in the chain decreases during operation, the force of the piston spring 4 causes the piston 3 to protrude from the housing 2. Then, the piston 3 moves in the arrow marked direction b along with the pawl member 5 and the teeth portion 5a engages with the rack teeth 3b or with the rack teeth 3b passing over the several teeth portion 5a of the pawl member 5 (see the solid line and dashed line of FIG. 4).

Protruding movement of the piston 3 creates a vacuum condition in the fluid chamber 30, thereby causing the check valve 7 to open to introduce engine oil into the fluid chamber 30 through the check valve 7 from the inlet passage 10. As a result, combined efforts of the force of the piston spring 4 and the hydraulic pressure of the fluid chamber 30 act upon the chain via the tensioner arm to maintain tension in the chain.

Next, when the chain tension increases and compressive force from the chain presses against the piston 3, the piston 3 retracts into the housing 2. That is, as shown by the dashed line and the solid line of FIG. 4, the piston 3 moves in the direction of the arrow marked b along with the pawl member 5 with the engagement of the rack teeth 3b of the piston 3 with the teeth portion 5a of the pawl member 5 being maintained. When the rear end surface 5a of the pawl member 5 comes into contact with the inside wall surface of the pawl hole 2b, the piston 3 stops. During this movement of the pawl member 5, a clearance is formed between the rear end surface 5b of the pawl member 5 and the inside wall surface of the pawl hole 2b prior to the transfer of the pawl member 5 which functions to provide backlash at the time of rearward movement of the piston 3. Such backlash can relieve shock load to the piston 3 even in the case where the chain has applied an excessive load to the piston.

In this case, the pawl member 5 having the teeth portion 5a engageable with the rack teeth 3b of the piston 3 is disposed with a longitudinal clearance formed relative to the pawl hole 2b, thereby simplifying the structure of a hydraulic tensioner with a backlash mechanism. Also, in this case, the rack teeth 3b are formed around the outer circumference of the piston 3, which eliminates the necessity for providing a rack separate from the piston, thereby simplifying the entire structure of the tensioner. Moreover, in this case, when the pawl member 5 moves in conjunction with the forward and rearward movement of the piston 3, as shown in FIG. 4, the pawl member 5 is in constant contact with the linear wire portions 60, 60' of the pawl coil spring 6.

The contact portions of the pawl coil spring 6 on the pawl member 5 before and after the transfer of the pawl member 5 are designated by the hatched portions 6A, 6B, respectively. The contact lengths and areas of the hatched portions 6A, 6B are the same. Thereby, the compressive force of the pawl coil spring 6 against the pawl member 5 is not changed in accordance with the transfer of the pawl member 5. The spring load of the pawl coil spring 6 relative to the pawl member 5 can thus be made constant. As a result, during operation, a constantly stable compressive load can be applied to the pawl member 5.

Figure 5:
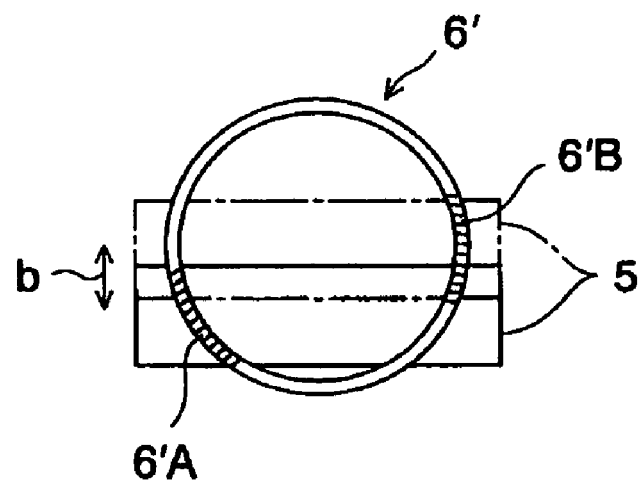
FIG. 5 is a top plan view illustrating a positional relationship between the cylindrically coiled pawl coil spring of the prior art and the pawl member for comparison to FIG. 4.

Next, for comparison with the present invention, a pawl coil spring in a cylindrical shape, which was typically used in the prior art, is shown in FIG. 5. In FIG. 5, like reference numbers indicate identical or functionally similar elements.

In this case, since the pawl coil spring 6' has a circular cross-sectional shape, the lengths and thus the areas of the contact portions 6'A, 6'B of the pawl coil spring 6' are different between before and after the transfer of the pawl member 5. Therefore, compressive force of the pawl coil spring 6' relative to the pawl member 5 may be altered in accordance with the pawl member 5.

In contrast, according to the present invention, since the pawl member 5 is constantly in contact with the linear portions of the pawl coil spring 6 before and after its transfer, the contact area of the pawl coil spring 6 can be made constant, and thus constant compressive force relative to the pawl member 5 can be maintained.

Also, in the above-mentioned embodiment, the cover 15 is attached to the tensioner but it may be omitted. In this case, for example, the opening portion of the pawl spring hole 2c of the housing 2 needs to be caulked to prevent the pawl coil spring 6 from falling out of the pawl spring hole 2c.

Figure 6:
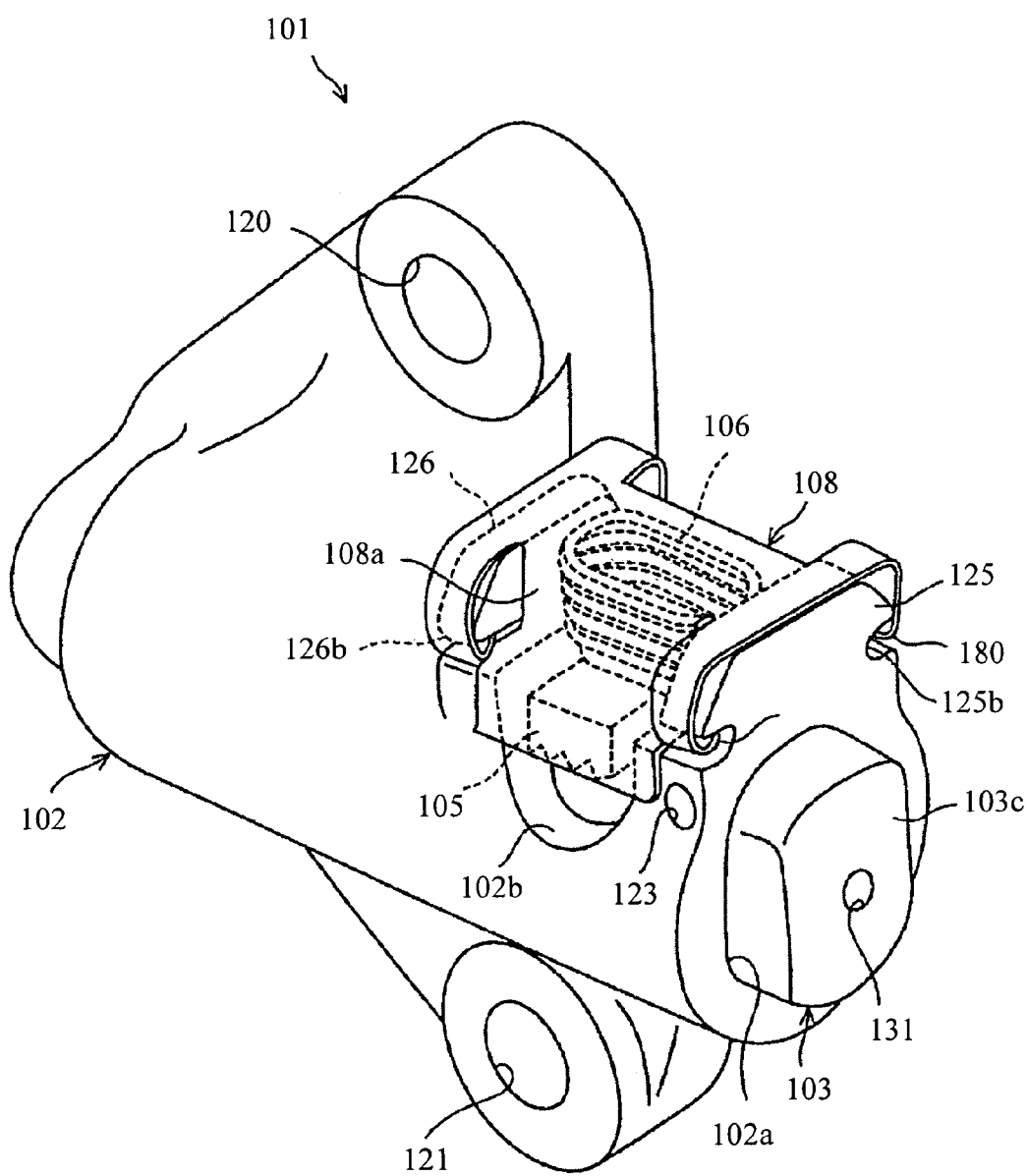
FIG. 6 is a perspective view of a hydraulic tensioner of an alternative embodiment.
Figure 7:
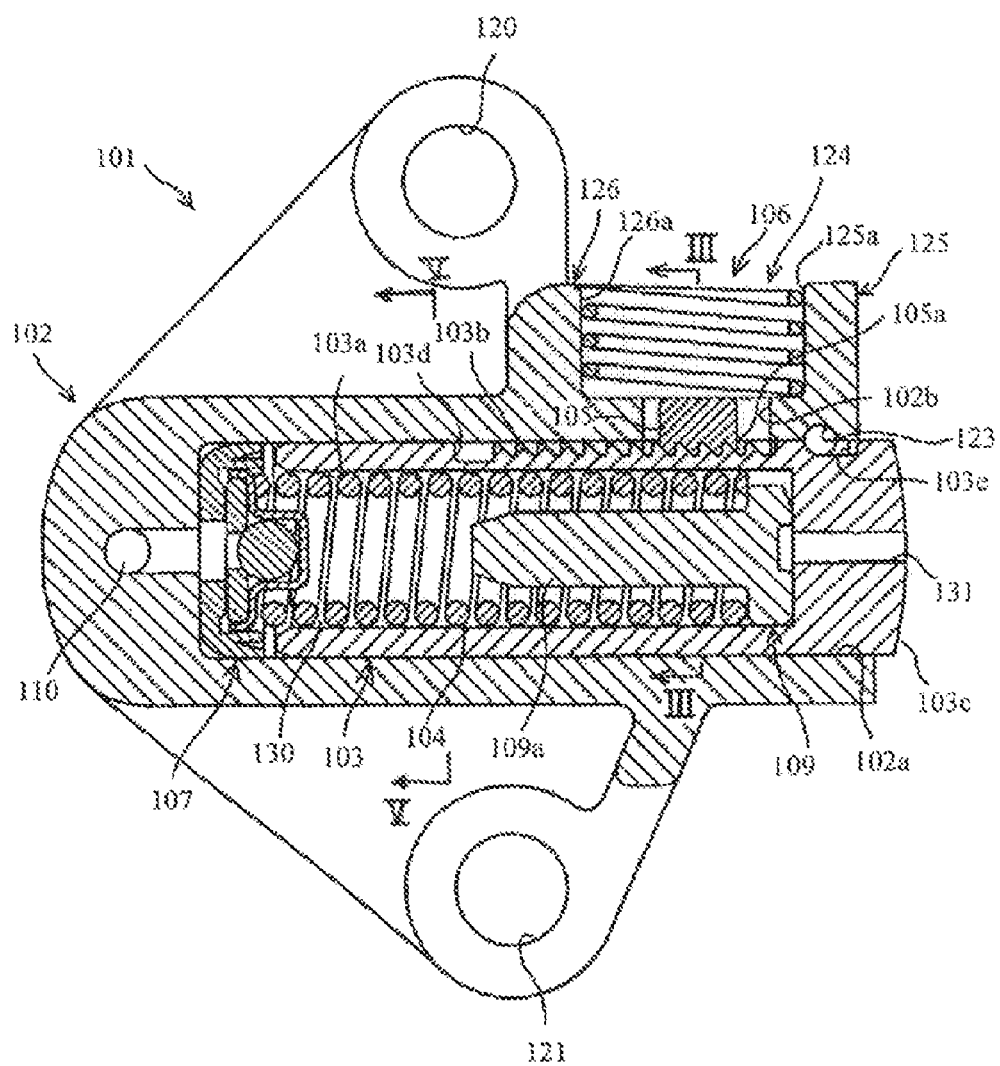
FIG. 7 is a longitudinal sectional view of the hydraulic tensioner of FIG. 6 without a cover.

In an alternative embodiment, shown in FIGS. 6 and 7, a hydraulic tensioner 101 includes a housing 102 with an axially extending piston bore 102a, one end of which opens outside, a hollow piston 103 fitted axially slidable in the bore 102a, and a piston spring 104 provided in the bore 102a and biasing the hollow piston 103 in a protruding direction from the bore 102a.

The housing 102 has attachment holes 120, 121 for inserting bolts (not shown) to fit the tensioner 101 onto the engine. Inside the housing 102, a fluid chamber 130 is defined by an inner space 103a formed in the piston 103 and an inside wall surface of the bore 102a. On the bottom of the housing 102, an inlet passage 110 is formed to introduce engine oil from an outside source of pressurized fluid (not shown) to the fluid chamber 130.

A check valve 107 is provided at a bottom portion of the bore 102a in the housing 102 to permit flow of fluid into the chamber 130 from the inlet passage 110 but to block fluid flow in a reverse direction. Here, a ball-type check valve is used, but any other suitable structure may be employed to form a check valve.

A vent disk 109 is provided on the top side of the inner space 103a of the piston 103 to discharge air trapped in the fluid chamber 130 to the outside of the tensioner and to control leakage of the fluid from the fluid chamber 130. The vent disk 109 has a spiral groove (not shown) on the side surface thereof and a shaft portion 109a. The top portion of the piston 103 has an axially extending through hole 131. Air in the fluid chamber 130 along with the fluid containing the air is discharged to the outside the tensioner from the spiral groove of the vent disk 109 through the hole 131. The piston spring 104 is provided around the shaft portion 109a of the vent disk 109 and an end of the piston spring 104 biases the vent disk 109 toward the top portion of the piston 103.

Rack teeth 103b are formed on a portion of an outer circumference of the piston 103. A pawl hole 102b is formed to penetrate the housing 102 laterally and upwardly to connect with piston bore 102a. A pawl member 105 is housed in the pawl hole 102b. The pawl member 105 has a teeth portion 105a formed on the bottom surface thereof to engage with the rack teeth portion 103b of the piston 103 and to permit movement of the piston 103 in a protruding direction and restrain rearward movement. Between the front rear end surface and the rear end surface of the pawl 105 and the pawl hole 102b, a clearance is formed (see FIG. 10) and the inequality, t<d is satisfied, where t is the longitudinal width of the pawl 105 and d is the longitudinal length of the pawl hole 102b. The pawl 105 is longitudinally translatable in the pawl hole 102b for the length of the clearance (d-t).

A pair of upwardly extending walls 125, 126 spaced apart in the longitudinal direction are provided on the upper opening portion of the pawl hole 102b of the housing 102. In the pawl spring housing portion 124 defined by the walls 125, 126, a pawl coil spring 106 is compressed to bias the pawl 105 against the piston 103 so that the teeth portion 105a of the pawl 105 engage with the rack teeth portion 103b of the piston 103. The pawl coil spring 106 is coiled in a generally elliptically cylindrical shape (see FIG. 9).

Figure 10:
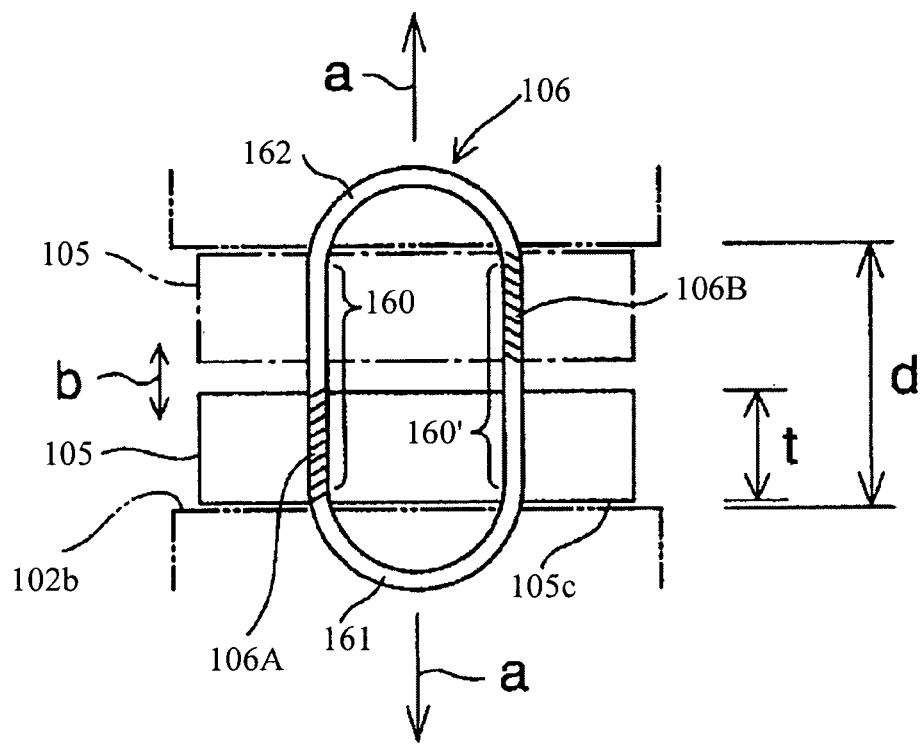
FIG. 10 is a top plan view showing the relationship between the pawl coil spring coiled in a substantially elliptically cylindrical form and the pawl in the alternative hydraulic tensioner.

As shown in FIG. 10, the direction a of the major axis of a generally elliptical cross sectional shape of the pawl coil spring 106 coincides with the axial direction b of the piston 103. Wire portions 160, 160' of the major axis on the bottom of the pawl coil spring 106 extend substantially along the direction a and press against the upper surface 105b of the pawl 105. The wire portions 160, 160' of the semi-circular portions 161, 162 are formed at opposite ends of the wire portions 160, 160'.

Figure 8A:
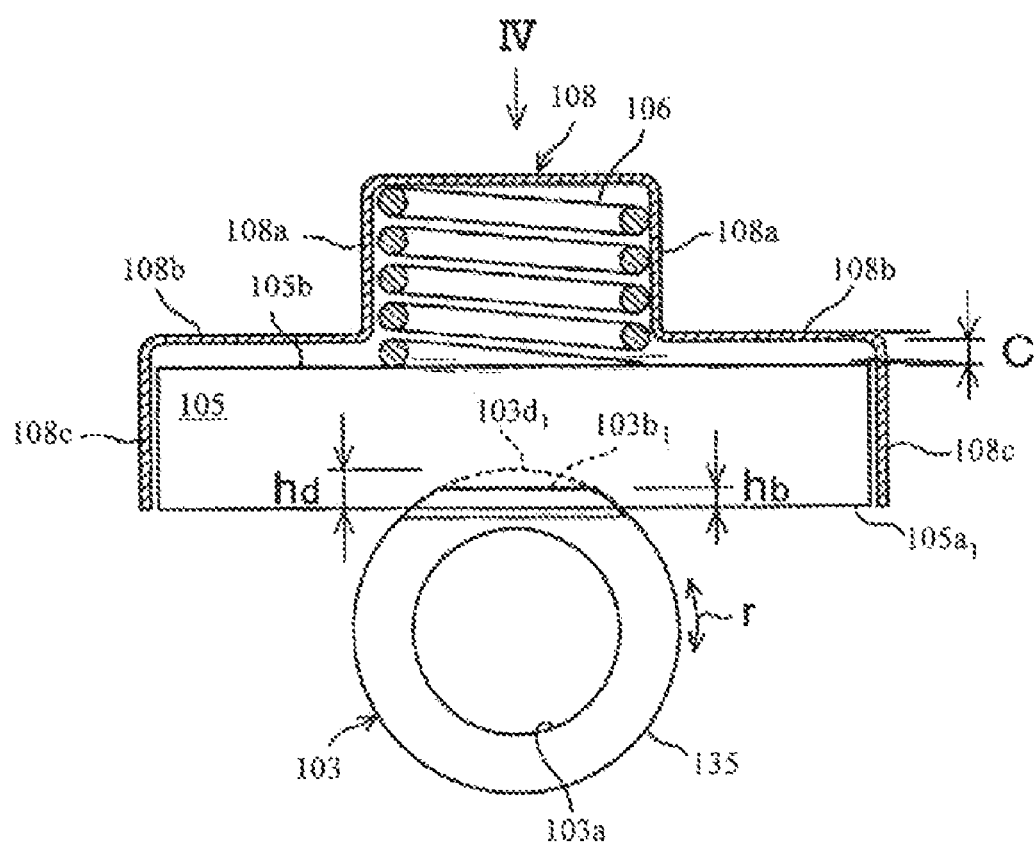
FIG. 8A shows a cross-sectional view of FIG. 7 along line III-III, showing a section of the cover.
Figure 8:
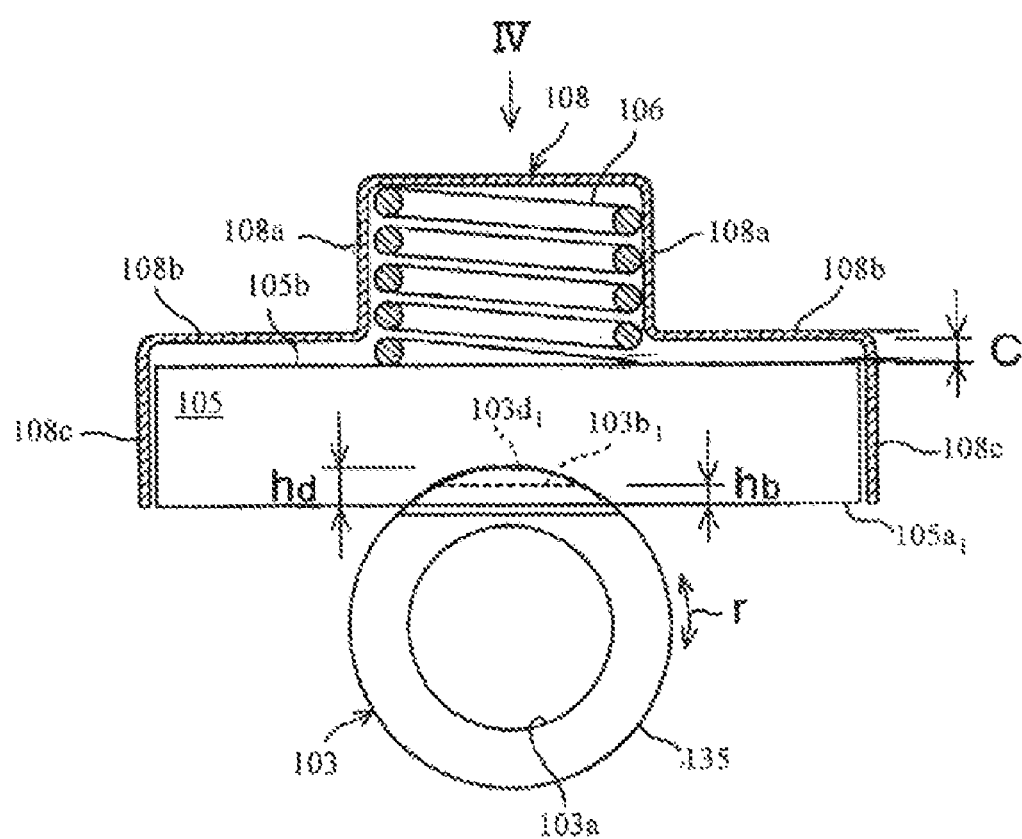
FIG. 8B shows a cross-sectional view of FIG. 7 along line V-V.
Figure 9:
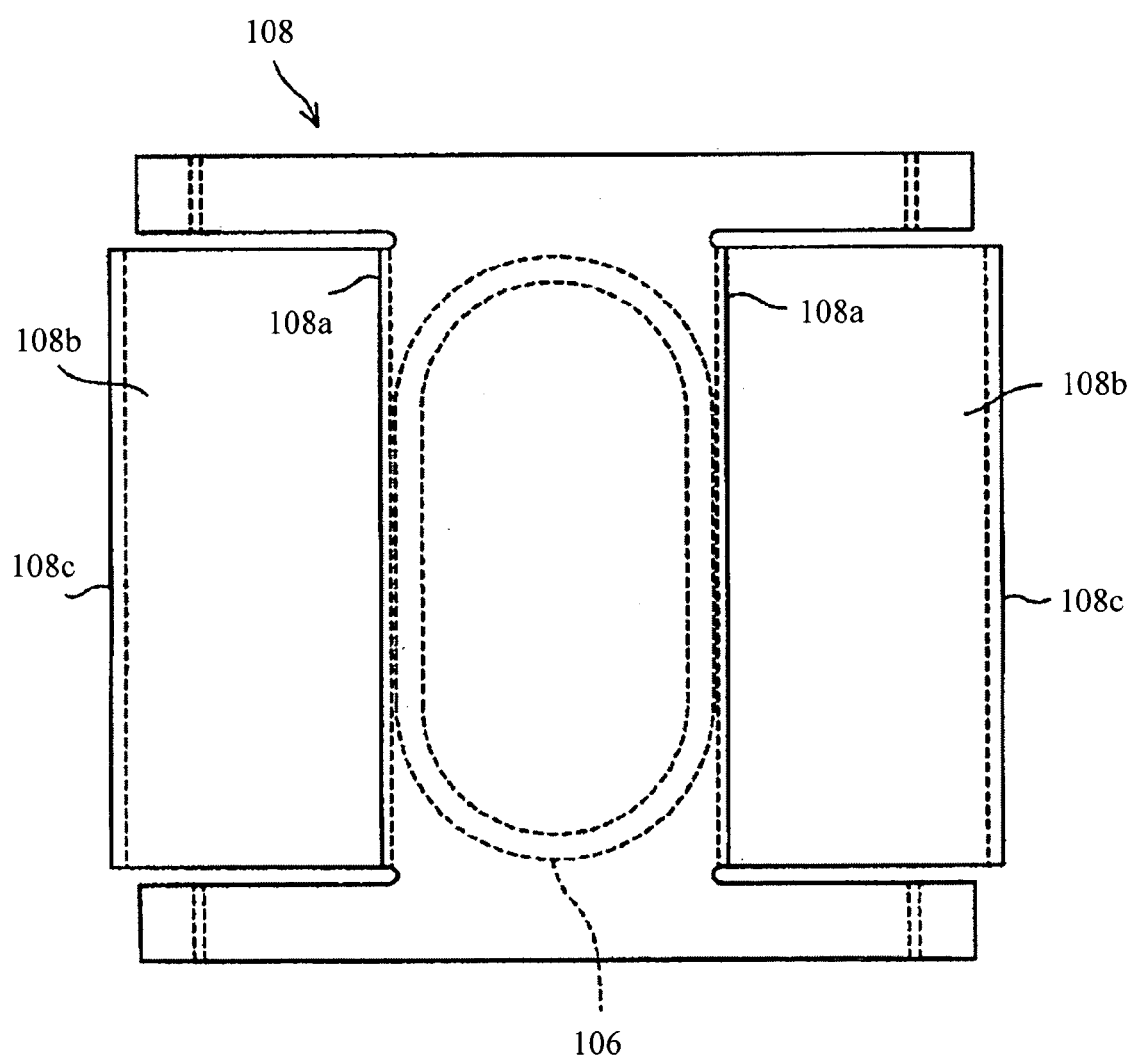
FIG. 9 shows a schematic viewed from IV of FIG. 8.

The pawl coil spring 106 has a cross-sectional shape formed of a pair of linear portions and semi-circular portions, which is of the shape described mathematically as a "Cassini ellipse". However, it will be understood by one skilled in the art that the spring of the present invention may also have a conventional elliptical cross-sectional shape, in which the linear portions are slightly curved. For the purposes of this invention it will be understood that when the term "elliptical" or "generally elliptical" is used, what is meant is either a Cassini ellipse or a conventional ellipse or similar figures The pawl spring housing portion 124 opens upwardly and sideways and a cover 108 is detachably provided to cover these opening portions of the housing 102 to prevent the pawl coil spring 106 from falling out of the pawl spring housing portion 124, as shown in FIG. 6. The upper end of the pawl coil spring 106 presses against the lower surface of an upper surface of the cover 108. The cover 108 is preferably formed by bending a sheet metal. A portion of the cover 108 preferably has a plurality of inwardly bent engaging hooks 180 which detachably engage with indented portions 125b, 126b of the lower ends of the walls 125, 126 of the housing 102. The cover 108 also preferably has a pair of supporting portions 108a that extend downwardly to support the pawl coil spring 106 in the lateral direction. Shoulders 108b of the cover 108 extend sideways from the lower ends of the supporting portions 108a to cover the upper surface 105b of the pawl 105. A pair of downwardly extending portions 108c extending downwardly from the end of the shoulder portions 108b to cover the opposite side surfaces of the pawl 105 as shown in FIGS. 8 and 9.

The clearance C between the inner surface of the shoulder portion 108b and the upper surface 105a of the pawl 105 satisfies the inequality, $h_b<C<h_d$, where $h_b$ is a distance between the distal end surface 105a1 of the teeth portion 105a of the pawl 105 and the distal end surface 103b1 of the rack teeth portion 103b of the piston 103 and $h_d$ is a distance between the distal end surface 105a1 of the teeth portion 105a and the outer circumferential surface 135 of the piston 103.

As shown in FIG. 7, a through hole 123 is formed in the vicinity of the opening portion of the piston bore 102a of the housing 102 to penetrate the housing 102 in the lateral direction. On the top portion of the piston 103, an engaging groove 103e extending in the lateral direction is formed. The through hole 123 and the engaging groove 103e are provided to support the piston 102 in the retracted state at the time of transportation of the tensioner. By inserting a shipping pin (not shown) into the through hole 123 and engaging groove 103e in the state where the piston 102 is retracted and the through hole 123 is aligned with the engaging groove 103e, the piston 102 is maintained at the retracted state.

A stop groove 103d is formed at the back of the rearmost tooth of the rack teeth 103b of the piston 103. The stop groove 103d is provided to prevent further protrusion of the piston 103 by engagement with the teeth portion 105a of the pawl member 105.

When tension in the chain decreases or slack in the chain occurs, the spring force of the piston spring 104 causes the piston 103 to protrude from the housing 102. Then, the piston 103 moves in the arrow marked direction b along with the pawl member 105 and the teeth portion 105a engages with the rack teeth 103b or with the rack teeth 103b passing over the several teeth portion 105a of the pawl member 105 (see a solid line and dash-and-dot-line of FIG. 10).

Protruding movement of the piston 103 creates a vacuum condition in the fluid chamber 130, thereby causing the check valve 107 to open to introduce engine oil into the fluid chamber 130 through the check valve 107 from the inlet passage 110. As a result, combined efforts of the force of the piston spring 104 and the hydraulic pressure of the fluid chamber 130 act upon the chain via the tensioner arm to maintain tension in the chain.

Next, when tension in the chain increases and compressive force from the chain presses against the distal end surface 103c of the piston 103, the piston 103 retracts into the housing 102. That is, as shown by the dashed line and solid line of FIG. 10, the piston 103 moves in the direction of the arrow marked direction b along with the pawl 105 member with the engagement of the rack teeth portion 103b of the piston 103 with the teeth portion 105a of the pawl 105 being maintained. When the rear end surface 105c of the pawl member 105 contacts the inside wall surface of the pawl hole 102b, the piston 103 stops traveling. During this movement of the pawl member 105, a clearance is formed between the rear end surface 105b of the pawl member 105 and the inside wall surface of the pawl hole 102b prior to the transfer of the pawl member 105 which functions to provide backlash at the time of rearward movement of the piston 103. Such backlash can relieve shock load to the piston 103 even when the chain has applied an excessive load to the piston.

In this case, the pawl member 105 having the teeth portion 105a engageable with the rack teeth portion 103b of the piston 103 is disposed with a longitudinal clearance formed relative to the pawl hole 102b, thereby simplifying the structure of a hydraulic tensioner with a backlash mechanism. Also, in this case, when the pawl 105 moves in conjunction with the forward and rearward movement of the piston 103, it is always in contact with the linear wire portions 160, 160' of the pawl coil spring 106, as shown in FIG. 10.

The contact portions of the pawl coil spring 106 on the upper surface 105b of the pawl member 105 before and after the transfer of the pawl member 105 are designated by reference numerals 106A, 106B, respectively. The contact portions 106A, 106B are the same contact length and the same contact area. Thereby, compressive force of the pawl coil spring 106 against the pawl member is not changed in accordance with the transfer of the pawl member 105. The spring load of the pawl coil spring 106 relative to the pawl member 105 can thus be made constant. As a result, during operation, a constantly stable compressive load can be applied to the pawl member 105.

Figure 11:
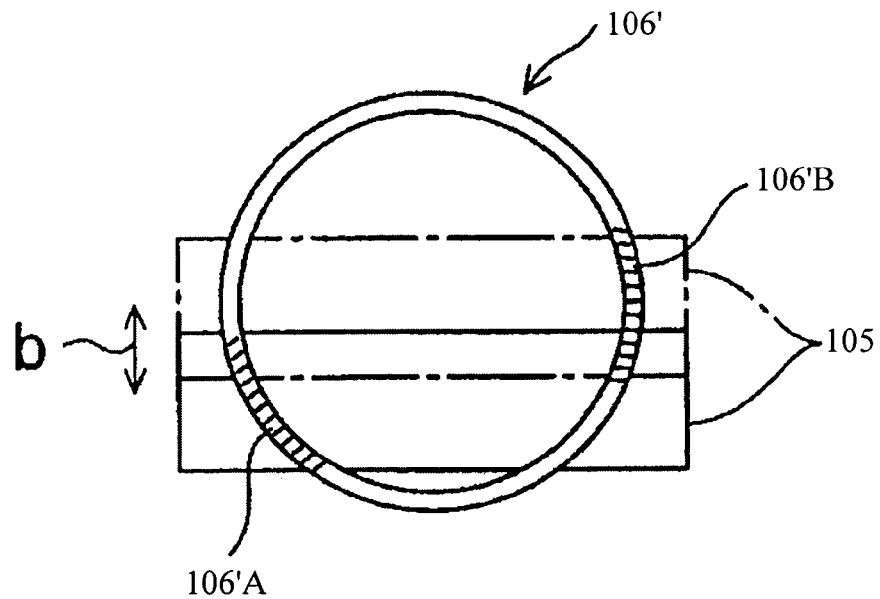
FIG. 11 is a top plan view showing the relationship between the cylindrically coiled pawl coil spring and the pawl for comparison with FIG. 10.

A pawl coil spring in a cylindrical shape, which was typically used in the prior art, is shown in FIG. 11 for comparison with the present invention. In FIG. 11, like reference numbers indicate identical or functionally similar elements.

In this case, since the pawl coil spring 106' has a circular cross-sectional shape, the lengths and thus the areas of the contact portions 106'A, 106'B of the pawl coil spring 106' before the transfer of the pawl member are different than the contact portions 106'A, 106'B after the transfer of the pawl member 105. Therefore, compressive force of the pawl coil spring 106' relative to the pawl member 105 may be altered in accordance with the pawl member 105.

Also, according to the embodiment of the present invention, since the cover 108 that covers the pawl spring housing portion 124 has the supporting portion 108a to support the pawl coil spring 106 in the lateral direction, the pawl coil spring 106 having the elliptical cross sectional shape is stably supported. Furthermore, since the cover 108 is provided discretely from the housing 102, a cover that follows the contour of the pawl coil spring 106 can be easily formed, thereby reducing manufacturing costs.

Moreover, in the embodiment of the present invention, since there is a relation of $h_b<C$, the rack teeth portion 103b of the piston 103 can travel over the teeth portion 105a of the pawl 105 without the upper surface 105b of the pawl member 105 interfering with the inner wall surface of the shoulder portion 108b of the cover 108 when the rack teeth portion 103b of the piston 103 rides onto the teeth portion 105a of the pawl 105 to lift up the pawl 105 upwardly during protruding movement of the piston 103 in operation, thereby achieving a smooth protrusion of the piston 103.

Also, when trying to release the engagement state of the rack teeth portion 103b of the piston 103 with the teeth portion 105a of the pawl member 105 by rotating the piston 103, the outer circumference surface 135 (FIG. 8) of the piston 103 without a rack teeth portion 103b cannot be transferred to the position of the teeth portion 105a of the pawl member 105, due to the relationship of $C<h_d$. This prevents unexpected disengagement of the rack teeth portion 103b of the piston 103 with the teeth portion 105a of the pawl member 105.

When the piston 103 protrudes a maximum amount with the shipping pin having fallen out of the through hole 123 of the housing 102 at the time of transportation or installation of the tensioner, a rear wall surface of the stop groove 103d (FIG. 7) of the piston 103 contacts the pawl 105. Then, since $C<h_d$, the upper surface 105b of the pawl member 105 interferes with the inside wall surface of the shoulder portion 108b of the cover 108 and thus the pawl 105 is prevented from riding onto the distal end surface 103d1 (that corresponds to the outer circumferential surface 135 of the piston 103) of the rear side wall surface of the stop groove 103d. As a result, disengagement of the rack teeth portion 103b of the piston 103 with the teeth portion 105a of the pawl 105 is prevented, preventing the piston 103 from falling out.

In the above-mentioned embodiment, preferably the cross sectional shape of the pawl coil spring 106 is formed of a pair of linear portions and semi-circular portions, but the present invention is also applicable to a pawl coil spring of a true elliptical cross sectional shape.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner for imparting tension to a chain comprising:
    a housing having an axially extending piston hole, the piston hole having at least one end open to atmosphere, a pawl spring hole extending inwards towards the piston hole from an outer surface of the housing, and a pawl hole extending laterally and communicating between the piston hole and the pawl spring hole;
    a piston having a first end for applying tension to the chain and a second end comprising rack teeth formed on at least a portion of an outer circumference thereof, the piston being axially slidable and forming a fluid chamber between the second end and the end of the piston hole of the housing;
    a piston spring in the fluid chamber of the housing for biasing the piston in a protruding direction;
    a pawl member having a front surface, a rear surface, an upper surface, a lower surface, joined by a pair of side surfaces wherein teeth are formed on the lower surface thereof and engageable with the rack teeth of the piston, wherein the teeth and the teeth of the pawl member permit movement of the piston in a protruding direction but prevent movement of the piston in a retracting direction;
    a pawl coil spring located in the pawl spring hole for biasing the teeth of the pawl member to engage the rack teeth of the piston and having an elliptical cross-sectional shape comprising: a pair of linear portions disposed opposite each other and a long axis, and a pair of semi-circular portions disposed at opposite ends of the linear portions; and
    a cover for covering the pawl spring hole and the pawl coil spring in the housing having an upper surface connected to pair of supporting portions extending downward and inward towards the piston to support the pawl coil spring in a lateral direction, shoulders extending sideways from lower ends of the supporting portions to cover up the upper surface of the pawl, and a pair of downwardly extending portion extending downward and inward towards the piston from the ends of the shoulder to the piston hole to cover the pair of side surfaces of the pawl member;
    wherein the pawl hole is located relative to the pawl spring hole such that the linear portions of the pawl coil spring contact the upper surface of the pawl member; and
    wherein a clearance is formed between an inner surface of the shoulders extending from the lower ends of the pair of supporting portions and the upper surface of the pawl member is less than a first distance between a distal end surface of the teeth of the pawl member and a surface on the outer circumference of the piston and the clearance is greater than a second distance between a distal end surface of the teeth of the pawl member and a distal end surface of the rack teeth of the piston.

2. The hydraulic tensioner of claim 1, wherein a clearance is formed between the front surface and the rear surface of the pawl member and the pawl hole.

3. The hydraulic tensioner of claim 1, wherein the pawl spring hole has an elliptical cross-sectional shape.

4. The hydraulic tensioner of claim 1, wherein a long axis of the elliptical cross-sectional shape of the pawl coil spring is oriented toward an axial direction of the piston.

* * * * *